US010440684B2

(12) United States Patent
Wu et al.

(10) Patent No.: US 10,440,684 B2
(45) Date of Patent: Oct. 8, 2019

(54) DEVICE-TO-DEVICE WIRELESS COMMUNICATION METHOD AND DEVICE

(71) Applicant: ZTE CORPORATION, Guangdong (CN)

(72) Inventors: Shuanshuan Wu, Guangdong (CN); Bo Dai, Guangdong (CN); Shuanghong Huang, Guangdong (CN); Lin Chen, Guangdong (CN); Ying Liu, Guangdong (CN); Haigang He, Guangdong (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 15/749,439

(22) PCT Filed: Jul. 21, 2016

(86) PCT No.: PCT/CN2016/090847
§ 371 (c)(1),
(2) Date: Jan. 31, 2018

(87) PCT Pub. No.: WO2017/020728
PCT Pub. Date: Feb. 9, 2017

(65) Prior Publication Data
US 2018/0234947 A1 Aug. 16, 2018

(30) Foreign Application Priority Data
Jul. 31, 2015 (CN) .......................... 2015 1 0466640

(51) Int. Cl.
*H04W 72/04* (2009.01)
(52) U.S. Cl.
CPC .................................. *H04W 72/04* (2013.01)

(58) Field of Classification Search
None
See application file for complete search history.

(56) References Cited

U.S. PATENT DOCUMENTS

| | | | |
|---|---|---|---|
| 2011/0268046 A1* | 11/2011 | Choi | H04L 5/0007 370/329 |
| 2013/0163499 A1 | 6/2013 | Cheng et al. | |

(Continued)

FOREIGN PATENT DOCUMENTS

| | | |
|---|---|---|
| CN | 101909354 A | 12/2010 |
| CN | 103024911 A | 4/2013 |

(Continued)

OTHER PUBLICATIONS

International Search Report dated Oct. 10, 2016 for International Application No. PCT/CN2016/090847, 7 pages.

(Continued)

*Primary Examiner* — Anh Ngoc M Nguyen
(74) *Attorney, Agent, or Firm* — Knobbe Martens Olson & Bear LLP

(57) ABSTRACT

A wireless communication method includes: determining a radio resource for wireless communication, where the radio resource at least includes a first resource set and a second resource set having different attributes; determine, according to content and/or a type of a message carried in a signal to be sent, a resource set used for sending the signal to be sent; and selecting a resource from the determined resource set to send the signal to be sent. This method ensures the delay requirement and the high reliability of specific signal transmission; and reduces the probability of signal collision and improves the reliability of signal transmission.

20 Claims, 2 Drawing Sheets

(56) References Cited

U.S. PATENT DOCUMENTS

| | | | |
|---|---|---|---|
| 2013/0242730 A1* | 9/2013 | Pelletier | H04W 28/0284 |
| | | | 370/230 |
| 2013/0288645 A1* | 10/2013 | Zheng | H04W 72/0446 |
| | | | 455/411 |
| 2014/0204856 A1* | 7/2014 | Chen | H04L 5/0053 |
| | | | 370/329 |
| 2015/0382205 A1* | 12/2015 | Lee | H04B 7/0417 |
| | | | 370/329 |
| 2016/0044724 A1* | 2/2016 | Seo | H04W 76/14 |
| | | | 370/329 |
| 2016/0073298 A1 | 3/2016 | Brahmi et al. | |
| 2016/0323923 A1* | 11/2016 | Wei | H04W 74/006 |
| 2016/0374105 A1* | 12/2016 | Kalhan | H04W 72/1278 |
| 2017/0170940 A1* | 6/2017 | Lee | H04L 5/0048 |
| 2017/0230918 A1* | 8/2017 | Ryu | H04W 52/383 |

FOREIGN PATENT DOCUMENTS

| | | |
|---|---|---|
| CN | 103238285 A | 8/2013 |
| CN | 103795646 A | 5/2014 |
| CN | 105451211 A | 3/2016 |
| WO | 2014173429 A1 | 10/2014 |

OTHER PUBLICATIONS

Written Opinion of the International Searching Authority dated Oct. 10, 2016 for International Application No. PCT/CN2016/090847, 5 pages.

* cited by examiner

DEVICE-TO-DEVICE WIRELESS COMMUNICATION METHOD AND DEVICE

CROSS REFERENCE TO RELATED APPLICATIONS

This application is the U.S. National Phase Application under 35 U.S.C. § 371 of International Application No. PCT/CN2016/090847 filed on Jul. 21, 2016, designating the U.S. and published as WO 2017/020728 A1 on Feb. 9, 2017, which claims the benefit of Chinese Patent Application No. 201510466640.6, filed on Jul. 31, 2015, which are hereby incorporated by reference in their entirety.

TECHNICAL FIELD

The present disclosure relates to, but is not limited to, the communication field and, in particular, relates to a wireless communication method and device.

BACKGROUND

With the development of the communication technology and the enrichment of demands, the application scenarios of wireless communication are increasingly wider. In some communication scenarios, high requirements are imposed on reliability and timeliness of data transmission. A typical example of such communication scenarios is Vehicle Networking.

Vehicle Networking refers to a technology in which a vehicle can participate in wireless communication, and traffic safety early warning and remote vehicle control are implemented based on wireless communication. For example, for the traffic safety early warning, while the vehicle is moving, when behaviors like deceleration/braking, lane change and vehicle out of control, etc. that may affect surrounding vehicles occur, if surrounding vehicles or pedestrians can be informed by use of Vehicle-to-Vehicle (V2V), Vehicle-to-Infrastructure (V2I) or Vehicle-to-Pedestrian (V2P) methods based on wireless communication, then traffic accidents may be prevented.

However, as mentioned above, Vehicle Networking communication imposes high requirements on reliability and timeliness of data transmission. Reliability generally refers to a case where a data packet in communication can be correctly received by a receiving terminal. Timeliness refers to a case where a data transmission delay is as short as possible. Only when reliability and timeliness are ensured, can Vehicle Networking play its role in traffic safety.

When Vehicle Networking is implemented based on a cellular communication network, a base station may assist in scheduling of Vehicle Networking data. This scheduling can avoid collisions of data transmissions of different sending terminals, thus ensuring reliability to some extent. However, scheduling by the base station may cause an additional delay that affects timeliness of Vehicle Networking communication. In contrast, an autonomous resource allocation manner may be considered, such as autonomous scheduling of Device-to-Device (D2D) communication in a Long Term Evolution (LTE) system. However, when a resource load is large, the probability of signal collision in autonomous scheduling mode increases sharply, affecting the reliability of data transmission.

SUMMARY

The following is a summary of a subject matter described herein in detail. This summary is not intended to limit the scope of the claims.

The present disclosure provides a wireless communication method and device to ensure the delay requirement of specific signal transmission.

According to a first aspect, embodiments of the present disclosure provide a wireless communication method. The method includes:

Determining a radio resource for wireless communication, where the radio resource includes at least a first resource set and a second resource set having different attributes;

Determining, according to content and/or a type of a message carried in a signal to be sent, a resource set for sending the signal to be sent; and Selecting a resource from the determined resource set to send the signal to be sent.

Optionally, this method further has the following features, the determining, according to the content of the message carried in the signal to be sent, the resource set for sending the signal to be sent includes:

When the content of the message meets a preset condition, determining that the first resource set is used for sending the signal to be sent; and when the content of the message does not meet the preset condition, determining that both of the first resource set and the second resource set are used for sending the signal to be sent, or determining that the second resource set is used for sending the signal to be sent.

Optionally, this method further has the following features, the determining, according to the content of the message carried in the signal to be sent, the resource set for sending the signal to be sent includes:

After selecting the resource from the determined second resource set to send the signal, if the content of the message carried in the signal to be sent meets the preset condition, switching to the first resource set to send the signal to be sent or stopping sending the signal to be sent through the second resource set.

Optionally, this method further has the following features, the determining, according to the type of the message carried in the signal to be sent, the resource set for sending the signal to be sent includes:

If the type of the message is a periodic message, determining that the first resource set is used for sending the signal to be sent; and if the type of the message is a burst message, determining that the second resource set is used for sending the signal to be sent; or the type of the message is a number of transmissions of the message in one resource period, if the number of transmissions of the message is less than or equal to a first threshold, determining that the first resource set is used for sending the signal to be sent; and if the number of transmissions of the message is greater than the first threshold, determining that the second resource set is used for sending the signal to be sent; or the type of the message is a size of the load of the message, if the size of the load of the message does not exceed a second threshold, determining that the first resource set is used for sending the signal to be sent; and if the load of the message exceeds the second threshold, determining that the second resource set is used for sending the signal to be sent; or the type of the message is a format of the message, where the format of the message is determined by the size of the load of the message and/or determined by whether the load of the message is variable, determining, according to the format of the message, the resource set used for sending the signal to be sent; or If the type of the message is a first-time transmission, determining that the first resource set is used for sending the signal to be sent; and if the type of the message is a retransmission, determining that the second resource set is used for sending the signal to be sent.

Optionally, this method further has the following features, the determining, according to the content and/or the type of the message carried in the signal to be sent, the resource set for sending the signal to be sent includes:

If a duration for sending the signal via the resource selected from the determined second resource set reaches a preset maximum duration or the signal has been consecutively sent through the resource selected from the determined second resource set for a preset maximum times, switching to the first resource set to send the signal to be sent or stopping sending the signal to be sent via the second resource set.

Optionally, this method further has the following features, the selecting the resource from the determined resource set to send the signal to be sent includes:

When the first resource set overlaps the second resource set, if the resource selected from the determined first resource set belongs to the second resource set, stopping sending the signal to be sent via the first resource set.

Optionally, this method further has the following features, the selecting the resource from the determined resource set to send the signal to be sent includes:

Determining, according to a sending probability, whether to select the resource from the determined resource set in a current resource period to send the signal to be sent; or Determining, according to a size of a back-off window, a resource period for sending the signal to be sent; and selecting the resource from the determined resource set according to the determined resource period to send the signal to be sent.

Optionally, this method further has the following features, the selecting the resource from the determined resource set to send the signal to be sent includes:

If the determined resource set is the first resource set, determining, according to a sending probability, whether to select a resource from the first resource set in a current resource period to send the signal to be sent; or determining, according to a size of a back-off window, a resource period for sending the signal to be sent, and selecting the resource from the first resource set according to the determined resource period to send the signal to be sent; and/or If the determined resource set is the second resource set, then in each resource period within a validity period for sending the signal to be sent, selecting a resource from the second resource set to send the signal to be sent.

Optionally, this method further has the following features, this method further includes:

Monitoring the signal in one or more resource periods of the determined resource set; and Determining, according to a monitored resource load, a probability of sending the signal in the one or more resource periods or determining the back-off window according to the monitored resource load, where the resource load is determined by one or more of the following measurements: a signal reception power and a signal successful reception rate over the radio resource.

Optionally, this method further has the following features, this method further includes:

Monitoring the signal in one or more resource periods of the determined resource set; and Determining, according to a monitored resource load, sending power for sending the signal in the one or more resource periods, where the resource load is determined by one or more of the following measurements: a signal reception power and a signal successful reception rate over the radio resource.

The selecting the resource from the determined resource set to send the signal to be sent includes:

Selecting the resource from the determined resource set to send the signal to be sent with the sending power.

Optionally, this method further has the following features, the selecting the resource from the determined resource set includes:

Randomly selecting the resource from the determined resource set, or

Selecting the resource from the determined resource set according to a selection probability of each resource, where the selection probability of the each resource is predetermined, or is determined as follows: signal energy in the each resource of the determined resource set is monitored in the one or more resource periods of the determined resource set, and a probability of being selected for sending the signal is determined for each resource according to the signal energy.

Optionally, this method further has the following features:

The second resource set includes multiple resource sub-sets, and different resource sub-sets are used by different groups of sending terminals to send the signal; and When it is determined that the signal to be sent is sent via the second resource set, a resource sub-set used for sending the signal to be sent is determined according to group information.

According to a second aspect, embodiments of the present disclosure further provide a wireless communication device. The device includes:

A first determining module, which is configured to determine a radio resource for wireless communication, where the radio resource includes at least a first resource set and a second resource set having different attributes;

A second determining module, which is configured to determine, according to content and/or a type of a message carried in a signal to be sent, a resource set used for sending the signal to be sent; and A sending module, which is configured to select a resource from the determined resource set to send the signal to be sent.

Optionally, the above device also has the following features:

The second determining module is configured to: when the content of the message meets a preset condition, determine that the first resource set is used for sending the signal to be sent; and when the content of the message does not meet the preset condition, determine that the first resource set and the second resource set are used for sending the signal to be sent, or determine that the second resource set is used for sending the signal to be sent.

Optionally, the above device also has the following features.

The second determining module is further configured to: after a resource is selected from the determined second resource set to send the signal, if the content of the message carried in the signal to be sent meets the preset condition, switch to the first resource set to send the signal to be sent or stop the signal to be sent from being sent via the second resource set.

Optionally, the above device also has the following features, the second determining module is configured to:

If the type of the message is a periodic message, determine that the first resource set is used for sending the signal to be sent; and if the type of the message is a burst message, determine that the second resource set is used for sending the signal to be sent; or the type of the message is a number of transmissions of the message in one resource period, if the number of transmissions of the message is less than or equal to a first threshold, determine that the first resource set is used for sending the signal to be sent; and if the number of transmissions of the message is greater than the first designate value, determine that the second resource set is used for sending the signal to be sent; or the type of the message is a size of a load of the message, if the size of the load of the message does not exceed a second designate value, determine that the first resource set is used for sending the signal to be sent; and if the size of the load of the message exceeds the second designate value, determine that the second resource set is used for sending the signal to be sent; or the type of the message is a format of the message, where the format of the message is determined by the size of the load of the message and/or determined by whether the load of the message is variable, determine, according to the format of the message, the resource set used for sending the signal to be sent; or If the type of the message is a first-time transmission, determine that the first resource set is used for sending the signal to be sent; and if the type of the message is a retransmission, determine that the second resource set is used for sending the signal to be sent.

Optionally, the above device also has the following features.

The second determining module is further configured to: if a duration for sending the signal via the resource selected from the determined second resource set reaches a preset maximum duration or the signal has been consecutively sent through the resource selected from the determined second resource set for a preset maximum times, switch to the first resource set to send the signal to be sent or stop the signal to be sent from being sent via the second resource set.

Optionally, the above device also has the following features.

The sending module is configured to: when the first resource set overlaps the second resource set, if a resource selected from the determined first resource set belongs to the second resource set, stop the signal to be sent from being sent via the first resource set.

Optionally, the above device also has the following features. The sending module is configured to: determine, according to a sending probability, whether to select the resource from the determined resource set in a current resource period to send the signal to be sent; or determine, according to a size of a back-off window, a resource period for sending the signal to be sent; and select the resource from the determined resource set according to the determined resource period to send the signal to be sent.

Optionally, the above device also has the following features. The sending module is configured to: if the determined resource set is the first resource set, determine, according to a sending probability, whether to select a resource from the first resource set in a current resource period to send the signal to be sent; or determine, according to a size of a back-off window, a resource period for sending the signal to be sent, and select the resource from the first resource set according to the determined resource period to send the signal to be sent; and/or if the determined resource set is the second resource set, then in each resource period within a validity period for sending the signal to be sent, select a resource from the second resource set to send the signal to be sent.

Optionally, the above device also has the following features, this device further includes:

A monitoring module, which is configured to monitor the signal in one or more resource periods of the determined resource set, and to determine, according to a monitored resource load, a probability of sending the signal in the one or more resource periods or determine the back-off window according to the monitored resource load, where the resource load is determined by one or more of the following measurements: a signal reception power and a signal successful reception rate over the radio resource.

Optionally, the above device also has the following features.

The monitoring module is further configured to monitor the signal in one or more resource periods of the determined resource set; and to determine, according to a monitored resource load, sending power for sending the signal in the one or more resource periods, where the resource load is determined by one or more of the following measurements: the signal reception power and the signal successful reception rate over the radio resource; and The sending module is configured to select the resource from the determined resource set to send the signal to be sent with the sending power.

Optionally, the above device also has the following features.

The sending module is configured to: randomly select the resource from the determined resource set, or select the resource from the determined resource set according to a selection probability of each resource, where the selection probability of the each resource is predetermined, or is determined as follows: signal energy in the each resource of the determined resource set is monitored in the one or more resource periods of the determined resource set, and a probability of being selected for sending the signal is determined for each resource according to the signal energy.

Optionally, the above device also has the following features.

The second resource set determined by the first determining module includes multiple resource sub-sets, and different resource sub-sets are used by different groups of sending terminals to send the signal; and The second determining module is configured to, when determining that the signal to be sent is sent via the second resource set, determine, according to group information, the resource sub-set for sending the signal to be sent.

Embodiments of the present disclosure further provide a computer-readable storage medium configured to store computer-executable instructions for implementing the above-mentioned wireless communication method when the computer-executable instructions are executed.

As described above, embodiments of the present disclosure provide a wireless communication method and device. Multiple resource sets with different attributes are configured and handover between the resource sets is performed according to the content and/or the type of the message carried in the signal. This ensures the delay requirement and the high reliability of specific signal transmission. Moreover, the self-adaptive probabilistic sending method based on listening (monitoring) or the method for determining the back-off window further reduces the probability of signal collision and improves the reliability of signal transmission.

Other aspects can be understood after the accompanying drawings and detailed description are read and understood.

BRIEF DESCRIPTION OF DRAWINGS

The accompanying drawings described herein are used to provide a further understanding of the present disclosure, and form a part of the present application. The schematic embodiments and descriptions thereof in the present disclosure are used to explain the present disclosure, and do not form improper limits to the present disclosure. In the accompanying drawings.

DETAILED DESCRIPTION

Embodiments of the present disclosure will be described below in detail with reference to the accompanying drawings. If not in collision, the embodiments described herein and the features thereof may be combined with each other.

The technologies described herein are applicable to wireless communication systems or networks. A common wireless communication system may be based on technologies such as Code Division Multiplexing Access (CDMA), Frequency Division Multiplexing Access (FDMA), Orthogonal-FDMA (OFDMA) and Single Carrier-TDMA (SC-FDMA). For example, in a Third Generation Partnership Project (3GPP) Long Term Evolution (LTE)/LTE-Advanced (LTE-A) cellular communication system, a downlink (or forward link) is based on the OFDMA technology and an uplink (or reverse link) is based on the SC-FDMA technology. In the future, it is possible to support hybrid multiplexing access on one link.

Figure 1:
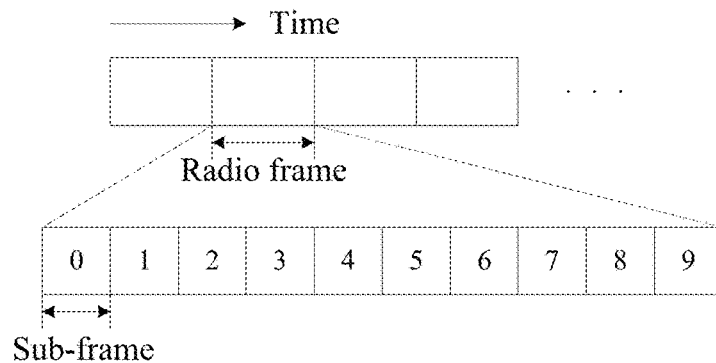
FIG. 1 is a schematic diagram showing a radio resource structure in the related art.

In an OFDMA/SC-FDMA system, a radio resource used for communication is in a time-frequency two-dimensional form. For example, in an LTE/LTE-A system, both of the communication resource of uplink and the communication resource of the downlink are divided in units of radio frames in the time direction. As shown in FIG. 1, each radio frame is 10 ms and contains 10 sub-frames, each sub-frame is 1 ms and contains two slots, and each slot is 0.5 ms. Depending on the configuration of a Cyclic Prefix (CP), each slot may contain 6 or 7 OFDM or SC-FDM symbols.

In the frequency direction, the resources are divided in units of subcarriers. In communications, the smallest unit for frequency domain resource allocation is a Resource Block (RB) that corresponds to a Physical RB (PRB). One PRB contains 12 subcarriers in the frequency domain that correspond to one slot in the time domain. Two adjacent PRBs in the time domain of a sub-frame are called a PRB pair. A resource corresponding to one subcarrier of each OFDM/SC-FDM symbol is called a Resource Element (RE).

The technologies described herein are applicable to peer-to-peer communication networks. For example, these technologies are applicable to device-to-device (D2D) communication between terminals (or User Equipment (UE)) and communication between vehicles equipped with a wireless communication module (similar to a UE), and the like. A peer-to-peer communication network may be integrated into a cellular communication network to form a hybrid network or may be an independent network, e.g., an independent peer-to-peer network formed in an area without cellular network coverage. For hybrid networks, UE autonomous resource allocation is receiving more attention due to its flexibility. UE autonomous resource allocation means that a UE selects resources for peer-to-peer communication among available resources by itself according to certain criteria. The available resources may be specified by a system, configured by a cellular network, or preconfigured.

A wireless communication method provided by embodiments of the present disclosure mainly includes the steps described below.

A resource set used for sending a message is divided into multiple ones. For example, the resources set is divided into multiple resource pools with different priorities such as {normal, hi-priority}. Normally, a message is sent through a normal resource pool (such as a periodically broadcasted V2V message). When an emergency occurs, the message is sent through a hi-priority resource pool (transmission via the normal resource pool may be continued or canceled). The emergency is judged on values of part or all parameters in the message, for example, parameters indicating deceleration, lane change, etc. in V2V communication.

Alternatively, a resource pool is divided into multiple ones, and the multiple resource pools are used for sending messages in different formats. The different formats may be judged on the sizes of the messages and/or whether the sizes of the messages are variable. For example, in V2V communication, V2V messages are divided into two formats: fixed size and variable size. The resource pool is divided into at least two resource pools, which are used for transmission of a message with a fixed size and transmission of a message with a variable size, respectively. Alternatively, in terms of a message with a fixed size, the transmission resource of the message may be further divided according to the size of the message, i.e., messages with different sizes are sent via different resource sets.

In addition, for sensing-based congestion relief, before a message is sent, a state of load of a resource pool is sensed (the load may be featured by a signal reception power or a signal successful reception rate), and the sending probability of the message, the size of a back-off window and a sending power may be determined according to the load. The resource period for sending the message may be determined according to the sending probability or the back-off window, or the message is sent according to the sending power.

In addition, for energy-listening based probability, before a resource is selected in the resource period, energy in each resource is listened for determining a selection probability that the resource is selected for sending signal. According to the selection probability of each resource, the resource for sending the signal is randomly selected.

Figure 2:
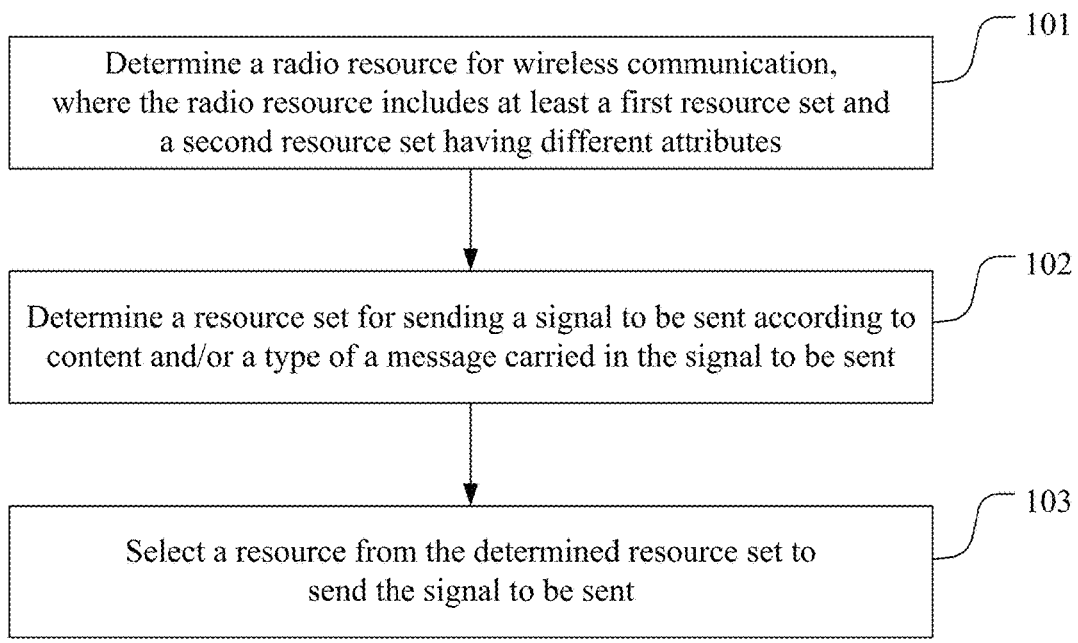
FIG. 2 is a flowchart of a wireless communication method according to an embodiment of the present disclosure.

In an embodiment, a wireless communication method is provided to improve the reliability of data transmission in wireless communication. The method is particularly applicable to a UE autonomous resource allocation manner. As illustrated in FIG. 2, the wireless communication method provided by this embodiment includes the steps described below.

In step 101, a radio resource for wireless communication is determined, where the radio resource at least includes a first resource set and a second resource set having different attributes.

In step 102, a resource set for sending a signal to be sent is determined according to content and/or a type of a message carried in the signal to be sent.

In step 103, a resource is selected from the determined resource set to send the signal to be sent.

The different attributes include one of the following: different priorities, different resource pool periods and different resource pool labels.

The type of the message includes a periodic message and a burst message. Alternatively, the type of the message includes a message including specific content and a message not including the specific content. The specific content may be a specific parameter in the message or may be message content that has certain functions such as security-related certificate information.

It is to be noted that the method is not limited to two resource sets. That is, the radio resource may include n resource pools having different attributes, where n is an integer greater than 1.

The priority refers to the priority of the message.

Optionally, when the content of the message meets a preset condition, the signal to be sent is sent through the first resource set; otherwise, the signal to be sent is sent through the first resource set and the second resource set, or the signal to be sent is sent through the second resource set. The preset condition is a condition that is met by the content of the message, which is determined according to the content of the message or according to the content of the message and a threshold.

For example, in Vehicle Networking communication, at least two resource sets, i.e., a first resource set and a second resource set, are allocated, or configured, or predefined. A UE (which may be a vehicle equipped with a wireless communication module herein) determines the resource set for sending the signal to be sent according to the content and/or type of a message carried in the signal to be sent. For example, while travelling, the vehicle sends a V2V message (such as a V2V early warning message, which is also referred to as a Cooperative Awareness Message (CAM) in some technologies). The V2V message may at least carry part or all of the following parameters: position, speed, acceleration, vehicle status and vehicle attribute. The position indicates the current absolute position of the vehicle and/or the lane of the vehicle and/or the travelling direction of the vehicle. The speed and the acceleration respectively indicate the current speed and the current acceleration of the vehicle. The vehicle status indicates whether the vehicle is changing lanes or turning, etc. The vehicle attribute indicates whether the vehicle is a special vehicle. The special vehicle may be an ambulance, a police car for performing a task, etc.

When the vehicle is travelling normally, the vehicle sends the V2V message periodically only through the first resource set. In case of an emergency, the vehicle switches to the second resource set to send the V2V message or sends the early warning message through the first resource set and through the second resource set simultaneously.

The normal travelling or the emergency is judged based on parameter values in the V2V message. For example, when the vehicle speed is lower than a threshold (the threshold is a configured value or predefined value), when the acceleration is lower or higher than thresholds, or when the vehicle status changes (such as lane change), then it is determined that the emergency occurs, and the resource set for sending the V2V message is changed. In other words, the preset condition, i.e., the vehicle status meets the condition of normal travelling; and when the preset condition is not met, the emergency may occur.

In this example, the first resource set may be referred to as a low-priority resource and the second resource set may be referred to as a high-priority resource. Alternatively, the first resource set may be used for sending a periodic V2V message and the second resource set may be used for sending a burst V2V message.

For example, when the resource set for sending the signal is determined according to the type of the message, the type of the message includes at least a periodic message and a burst message, and it is determined that the periodic message is sent through the first resource set and the burst message is sent through the second resource set.

Alternatively, the type of the message is a format of the message, where the format of the message is determined by a size of a load of the message and/or whether the size of the load of the message is variable.

For example, the format of the message includes the following two types: a format 1 with a fixed size and a format 2 with a variable size. In this case, messages in the two formats are transmitted through different resource sets. For example, when an arriving message is in the format 1, the message is transmitted through the first resource set; and when the arriving message is in the format 2, the message is transmitted through the second resource set.

For example, the format of the message includes the following two forms: a format 1 with a fixed size and a format 2 with a fixed size. In this case, types of messages are all fixed formats but loads of the messages are different.

For example, the format of the message includes multiple types, e.g., the following three types: a format 1 with a fixed size, a format 2 with a fixed size and a format 3 with a variable size. The three types of messages may be transmitted via three different resource sets, or messages in formats with fixed sizes (format 1 and format 2 in this example) are transmitted via the same resource set (e.g., the first resource set) while a message in the format with a variable size (i.e., format 3) is transmitted in a different resource set (e.g., the second resource set).

In an example, when a UE performs V2V communication and sends a V2V message, the UE may also need to send content related with security authentication. The size of the message is affected by whether the content related with security authentication is included. The message that contains the content related with security authentication may not have to be sent frequently.

For example, the UE periodically sends the V2V message via the first resource set. When the V2V message contains the content related to security authentication, the sending of the message is handed over to the second resource set. The handover means that, after the handing over, the UE sends the message via the first resource set and via the second resource set simultaneously or sends the message only via the second resource set. When the UE sends the message via the first resource set and via the second resource set simultaneously, what is sent via the first resource set is a message not containing the content related with security authentication. In other words, sizes of messages sent via the first resource set are the same.

In this example, the size of the message containing the content related with security authentication and the size the message not containing the content related with security authentication may be different significantly. Therefore, the type of the message may also be judged based on the size of the message or whether the message contains specific content. That is, when the number of bits in the message is small (not including the specific content), the message is sent via the first resource set; and when the number of bits in the message is large (including the specific content), the message sending is handed over to the second resource set. The meaning of the handover is as described above.

In an embodiment, the first resource set may be a resource set for discovery and the second resource set may be a resource set for communication.

Figure 3:
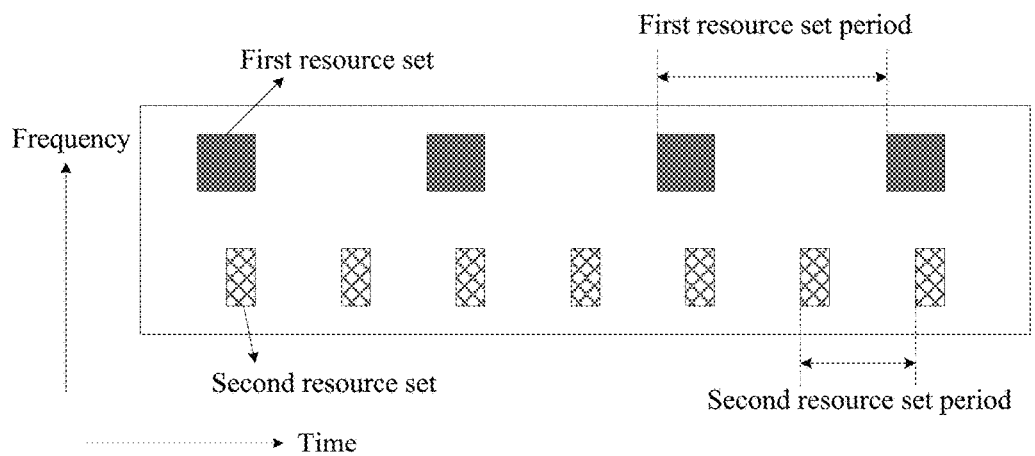
FIG. 3 is a schematic diagram of two determined resource sets according to an embodiment of the present disclosure.

As illustrated in FIG. 3, in an example, two periodic resource sets are configured for V2V message transmission. In each resource period, time-frequency resources for V2V message transmission are configured, which are respectively represented by different patterns. When it is determined that content of the V2V message to be sent meets a preset condition (e.g., a vehicle is travelling normally), the V2V message is sent via the first resource set; otherwise, the sending of V2V message is handed over to the second resource set. Generally, the second resource set may have a smaller resource period than the first resource set so as to ensure that message transmission via the second resource set has a smaller time delay.

In another embodiment, a resource set for sending a signal to be sent is determined according to the content and/or type of a message carried in the signal to be sent.

For example, the type of the message may include a periodic message and a sudden message. The periodic message and the burst message are sent in different resource sets.

Alternatively, the type of the message is the number of transmissions of the message. Messages whose numbers of transmissions are different are transmitted via resource sets with different attributes. The number of transmissions is the number of transmissions of the message in one resource period. For example, different messages have different numbers of transmissions, and the number of transmissions may be configured on the network side, pre-defined or preconfigured. When the message is sent, the resource set used for sending the message is determined according to the number of transmissions of the message. For example, the first resource set is used for sending a message whose number of transmissions is 2, and the second resource set is used for sending a message whose number of transmissions is 4, and so on.

Alternatively, the type of the message is the number of bits occupied by the message, and the messages occupying different numbers of bits are transmitted via resource sets with different attributes. For example, a V2V early warning message is small (the size of the data packet is small), and other V2V messages may be large (the size of the data packet is large). The two types of messages are transmitted via different resource sets.

Alternatively, the type of the message includes the first-time transmission of the message and the retransmission of the message. That is, the first-time transmission and the retransmission of a specific message are performed via different resource sets. For example, the first resource set is used for the first-time transmission of the message and the second resource set is used for the retransmission of the message.

Optionally, the first resource set is orthogonal to the second resource set. When the two resource sets inevitably overlap (e.g., in a resource-limited scenario), if the determined resource for sending the V2V message in the first resource set conflicts with the second resource set, sending via the first resource set is abandoned, i.e., sending of the signal via the second resource set has a higher priority. The overlap described here includes the following two cases: overlapping only in the time domain (i.e., occurring in the same sub-frame), and overlapping both in the time domain and in the frequency domain (i.e., occurring in the same sub-frame-level frequency domain resource block).

Optionally, when the V2V message is sent via the second resource set, the duration or the number of times of the sending is determined by a configured or predefined parameter. When the maximum duration or the maximum number of times is reached, the transmission of V2V message is handed over to the first resource set or the transmission of V2V message via the second resource set is terminated.

Alternatively, when the V2V message is sent via the second resource set, it is determined whether to terminate sending via the second resource set according to the content of the sent V2V message. That is, when the content of the V2V message to be sent meets the preset condition, the transmission of V2V message is handed over to the first resource set or the transmission of V2V message via the second resource set is terminated.

In an embodiment, when the UE has a message to send, the message is sent directly in a resource period. The resource period may be a resource period of the above first resource set or a resource period of the above second resource set. Alternatively, when the UE has a message to send, it is determined, according to a sending probability, whether to send a signal in the current resource period. Alternatively, when the UE has a message to send, the resource period for sending the message is determined according to the size of a back-off window.

In an embodiment, it is determined, according to a sending probability, whether to send a signal in the current resource period. The sending probability is determined as follows: the signal in previous one or more resource periods is monitored and the sending probability is determined according to a monitoring result.

The step in which the signal in previous one or more resource periods is monitored and the sending probability is determined according to the monitoring result means that a UE detects the signal in previous one or more resource periods to determine a resource load. For example, a smaller sending probability is determined when the load is larger, and, a larger sending probability is determined when the load is smaller.

For example, before sending a V2V message or while sending the V2V message, the UE monitors other V2V messages sent by other senders in a corresponding resource set. The corresponding resource set refers to a resource set same as the resource set about to send the message to be sent. For example, when the V2V message to be sent is about to be sent via the first resource set, the first resource set is monitored, i.e., the first resource set is the corresponding resource set. Through monitoring the corresponding resource set, the sending UE determines the load of the resource, thereby determining a corresponding sending probability.

The load may be weighed by a received power on the radio resource, e.g., Reference Signal Received Power (RSRP). An RSRP threshold may be set (configured, pre-configured or predefined). When the RSRP of a specific resource measured by the UE exceeds the threshold, it is considered that a signal is sent via the specific resource. The sending probability is determined according to the ratio of resources through which signals are sent to total measured resources. For example, when the UE measures M resources in one resource period (The size of each resource may be a specified resource unit that lasts for a certain period of time in the time domain and occupies a specific bandwidth in the frequency domain. For example, the size of the specified resource unit may be a physical resource block.), there are m resources whose RSRPs exceed the RSRP threshold in the M resources, and the resource load is m/M.

After the resource load is determined, the sending probability is determined according to the resource load. For example, a mapping between the resource load and the sending probability may be configured. Assuming that the values of the sending probability has four values: 0.25, 0.5, 0.75 and 1, three resource loading thresholds n1, n2 and n3 are configured correspondingly. Table 1 lists the mapping between the resource load and the sending probability.

TABLE 1

| Resource Load | Corresponding sending probability |
| --- | --- |
| m/M < n1 | 1 |
| n1 ≤ m/M < n2 | 0.75 |
| n2 ≤ m/M < n3 | 0.5 |
| n3 ≤ m/M | 0.25 |

It is to be noted that, in the above example, the probability values and the symbols "<" and "≤" are only illustrative and do not limit the scope of this embodiment.

Optionally, the monitoring may refer to monitoring one resource period to determine a sending probability in a next resource period; or the monitoring may be monitoring one resource period to determine a sending probability of multiple subsequent resource periods, i.e., the determined sending probability is applicable to multiple subsequent resource periods. The number of applicable resource periods is configured or is predefined. Alternatively, multiple resource periods are monitored to determine the sending probability of multiple subsequent resource periods, i.e., the determined sending probability is applicable to multiple subsequent resource periods. The number of monitored resource periods and/or the number of applicable resource periods is configured or is predefined.

Alternatively, the sending probability is determined according to the detected resource load. The resource load may be evaluated in terms of the signal reception power and a signal successful reception rate in the corresponding resource set. For example, the number of resources with signal transmissions is determined by the signal reception power and a configured reception power threshold. That is, when the reception power of a specific resource is greater than the power reception threshold, a signal is transmitted through this resource. Among resources with signal transmission, the proportion of successfully decoded resources is the signal successful reception rate. For example, if M resources are monitored, signals are sent through M1 resources among the M resources, and signals can be decoded successfully on only m resources among the M1 resources, then the signal successful reception rate is m/M1. Then, the sending probability is determined according to a mapping between the successful reception rate and the sending probability. The lower the successful reception rate is, the lower the corresponding sending probability is. Alternatively, the successful received rate is directly used as the sending probability. Details are not described here again. The signal reception power may also be RSRP.

In an embodiment, the resource period for sending a signal is determined according to a size of a back-off window. The size of the back-off window is determined as follows: the signal in previous one or more resource periods is monitored, the back-off window is determined according to a monitoring result, and the resource period for sending the signal is determined according to the size of the back-off window.

The step in which the signal in previous one or more resource periods is monitored, and the back-off window is determined according to the monitoring result means that the UE detects the signal in previous one or more resource periods so as to determine the resource load. When the load is larger, a larger back-off window value is determined; and when the load is smaller, a smaller back-off window value is determined. A mapping can be established between the size of the back-off window and the resource load. Calculation of the load is similar to the foregoing.

Optionally, the size of the back-off window is in a one-to-one correspondence with the resource load. For example, based on the foregoing example, the resource load is calculated as m/M, and the mapping between the resource load and the back-off window is illustrated in FIG. 2.

TABLE 2

| Resource Load | Corresponding back-off window |
| --- | --- |
| m/M < n1 | 1 |
| n1 ≤ m/M < n2 | 2 |
| n2 ≤ m/M < n3 | 3 |
| n3 ≤ m/M | 4 |

A unit of the back-off window may be the resource period. It is to be noted that the value of the back-off window is for example only.

Alternatively, the size of the back-off window and the resource load are not in a one-to-one correspondence. For example, different resource loading conditions correspond to a set of back-off windows. When the resource load is determined, the sending terminal randomly selects a back-off window value from the set of back-off windows corresponding to the resource load.

In an embodiment, the signal in previous one or more resource periods is monitored, and the sending power is determined according to the monitoring result; and the message is sent according to the determined sending power.

For example, the purpose of monitoring the signal in previous one or more resource periods is to determine a load in a resource set. Calculation of the load may be the same as the foregoing description, and details are not described here again. After the load is determined, the sending power is determined according to the load.

For example, different resource load levels correspond to different sending powers. The greater the load is, the smaller the sending power is. The resource load in the table 1 is taken as an example. Table 3 lists a correspondence between the loads and the sending powers. $P_{max}$ denotes the maximum sending power in units of milliwatts (mW) or decibel-milliwatts (dBm) and is configured by the network side, or preconfigured, or determined by the capability level of the sending terminal. p1, p2 and p3 denote adjustment steps of the sending power, and are configured by the network side, or preconfigured, where p1<p2<p3. The unit of the adjustment steps of the sending power is same as that of the maximum sending power. Here, adjustment steps of the sending power may also have a reference value, e.g., ps. In practice, the power is adjusted by multiples of ps. For example, in the above example, p1 is ps, p2 is 2*ps and p3 is 3*ps.

TABLE 3

| Resource Load | Corresponding sending power |
| --- | --- |
| m/M < n1 | $P_{max}$ |
| n1 ≤ m/M < n2 | $P_{max}$ − p1 |
| n2 ≤ m/M < n3 | $P_{max}$ − p2 |
| n3 ≤ m/M | $P_{max}$ − p3 |

Or for example, the UE has an initial sending power. In the process of sending the signal, the sending power is adjusted according to the monitored resource load and the power step. For example, the initial power is $P_I$, and different load thresholds are predetermined. When the UE monitors that the load is between the two thresholds, the sending power does not change; otherwise, when the load is smaller than a smaller threshold, the sending power is increased in units of the power step; otherwise, when the load is greater than a larger threshold, the sending power is reduced in units of the power step.

In an embodiment, when a signal (such as a V2V message) is to be sent in a certain resource period, the resource for sending the signal is selected in the resource period. The selection method includes at least one of the following: randomly selecting the resource for sending the signal in the resource period, and each resource within the resource period having the same probability of being selected; randomly selecting the resource for sending the signal in the resource period, the probabilities of being selected for each resource within the resource period may be different and the probability depending on the listening result of the corresponding resource in the previous resource period.

For example, a sending terminal monitors signal energy of the resource in one or more resource periods, and a probability of selecting the resource to send a signal is determined according to the signal energy. The selection probability is inversely proportional to the monitored energy. That is, the greater the monitored signal energy on a specific resource is, the smaller the sending probability corresponding to the resource is.

For example, energy on a resource in a resource period n (n is an integer greater than 0) is monitored to determine a selection probability of a resource unit in a resource period n+1. The resource units in the resource period n and the resource units in the resource period n+1 are in a one-to-one correspondence. The correspondence may be a correspondence between resources in different resource periods having the same time-frequency position or a one-to-one correspondence between resources in adjacent resource periods that is established based on a specific hopping rule.

Optionally, according to energy monitored on a specific resource in the resource period n, a selection probability of a corresponding resource in the resource period n+1 is determined. When the selection probability is inversely proportional to the monitored energy, a resource with the minimum energy corresponds to the maximum selection probability. For example, the selection probability of the resource with the minimum energy is 0.75, and the selection probabilities of the remaining resources are sorted in a descending order in accordance with their energy in a increasing order; or the selection probability of the resource with the minimum energy is 0.8, and the selection probability of the remaining resources is (1−0.8)/N, where N is the number of the remaining resources.

Optionally, the selection probability may be specified, e.g., the selection probability of the resource with the minimum energy is specified; or the selection probability may be configured or preconfigured, i.e., the selection probability of the resource with the minimum energy is configured or preconfigured; or the selection probability may be calculated according to the monitored energy.

Optionally, the signal energy may be measured by the signal's reception power, e.g., the foregoing RSRP, which will not described in detail again.

Optionally, when the signal is repeatedly sent in a resource period, the sending probability is determined according to a repeated pattern. For example, if the signal is sent four times in the resource period, then corresponding four resources are taken as a whole, and the sending probability is determined according to an energy monitoring result on the four resources.

In an embodiment, the signal transmission in the first resource set is based on probabilities (configured, preconfigured or predefined transmission probabilities, or probabilities determined based on monitoring) or based on a back-off window, and signals in the second resource set are always sent with a probability of 1.

In an embodiment, resources in the first resource set are selected completely randomly or in a random selection manner based on energy monitoring, and resources in the second resource set are selected completely randomly or in a random selection manner based on energy monitoring.

In an embodiment, the second resource set may include multiple resource sub-sets. The different resource sub-sets are used by sending terminals of different groups to send signals. When it is determined that a signal to be sent is sent via the second resource set, a resource sub-set selected for sending the signal to be sent is determined according to group information. For example, in V2V communication, communication terminals (e.g., the above-mentioned UE, or a wireless communication module mounted on a vehicle, which is also referred to as an On Board Unit (OBU)) may be classified into different groups. Terminals belonging to the same group send signals in the same sub-resource set. Different groups of terminals occupy different resource sets. For example, one way to group terminals is to group them according to their travelling directions. For example, on a dual carriageway, vehicles are classified into two groups according to travelling directions. Terminals travelling in the same direction are in the same group and use the same sub-resource set. Specific group information may be obtained from the application layer, or the terminals determine the specific group information by determining the travelling direction by themself. Alternatively, the vehicles are grouped according to lanes of the road on which the vehicles are travelling. For example, if the road has six traffic lanes, the terminals are classified into six groups that correspond to six resource sub-sets.

Optionally, terminals in different groups may use different resource sub-sets in the first resource set or, optionally, the first resource set is not divided into resource sub-sets, terminals in different groups share the entire first resource set.

It is to be noted that V2V in related embodiments is only used as an example and is not intended to be limiting. The related embodiments may be used in various forms of wireless communication networks and transmission links, e.g., V2I communication, D2D communication, and communication between a base station and a terminal; and an uplink, a downlink and a peer-to-peer (P2P) link.

Figure 4:
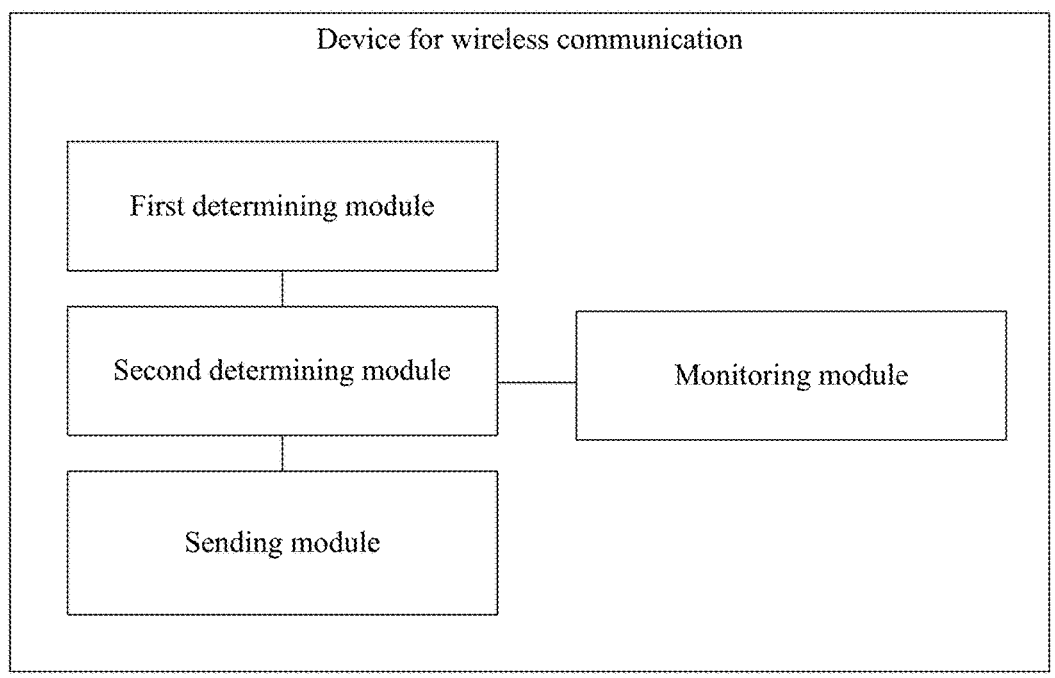
FIG. 4 is a schematic diagram of a wireless communication device according to an embodiment of the present disclosure.

FIG. 4 is a schematic diagram of a wireless communication device according to an embodiment of the present disclosure. As illustrated in FIG. 4, the device of this embodiment includes:

A first determining module, which is configured to determine a radio resource for wireless communication, where the radio resource includes at least a first resource set and a second resource set having different attributes;

A second determining module, which is configured to determine, according to content and/or a type of a message carried in a signal to be sent, a resource set used for sending the signal to be sent; and A sending module, which is configured to select a resource from the determined resource set to send the signal to be sent.

In an optional embodiment, the second determining module is configured to determine, according to the content of the message carried in the signal to be sent, the resource set used for sending the signal to be sent through the following way: when the content of the message meets a preset condition, determining that the first resource set is used for sending the signal to be sent; and when the content of the message does not meet the preset condition, determining that the first resource set and the second resource set are used for sending the signal to be sent, or determining that the second resource set is used for sending the signal to be sent.

In an optional embodiment, the second determining module is further configured to determine, according to the content of the message carried in the signal to be sent, the resource set used for sending the signal to be sent through the following way: after a resource for sending the signal is selected from the determined second resource set, if the content of the message carried in the signal to be sent meets the preset condition, switching to the first resource set so as to send the signal to be sent or terminating the signal transmission via the second resource set.

In an optional embodiment, the second determining module is configured to determine, by use of a method described below according to the type of the message carried in the signal to be sent, the resource set used for sending the signal to be sent:

If the type of the message is a periodic message, it is determined that the first resource set is used for sending the signal to be sent; and if the type of the message is a burst message, it is determined that the second resource set is used for sending the signal to be sent; or The type of the message is a number of transmissions of the message in one resource period, if the number of transmissions of the message is less than or equal to a first threshold, it is determined that the first resource set is used for sending the signal to be sent; and if the number of transmissions of the message is greater than the first threshold, it is determined that the second resource set is used for sending the signal to be sent; or The type of the message is a size of a load of the message, if the size of the load of the message does not exceed a second threshold, it is determined that the first resource set is used for sending the signal to be sent; and if the size of the load of the message exceeds the second threshold, it is determined that the second resource set is used for sending the signal to be sent; or The type of the message is a format of the message, where the format of the message is determined by the size of the load of the message and/or determined by whether the load of the message is variable, the resource set used for sending the signal to be sent is determined according to the format of the message; or If the type of the message is a first-time transmission, it is determined that the first resource set is used for sending the signal to be sent; and if the type of the message is a retransmission, it is determined that the second resource set is used for sending the signal to be sent.

In an optional embodiment, the second determining module is further configured to determine, by use of a method described below according to the content and/or the type of the message carried in the signal to be sent, the resource set used for sending the signal to be sent:

If a duration for sending the signal via the resource selected from the determined second resource set reaches a preset maximum duration or the signal has been consecutively sent through the resource selected from the determined second resource set for a preset maximum times, switching to the first resource set so as to send the signal to be sent or terminating sending the signal to be sent via the second resource set.

In an optional embodiment, the sending module is configured to select the resource from the determined resource set by use of a method described below to send the signal to be sent:

When the first resource set overlaps the second resource set, if a resource selected from the determined first resource set belongs to the second resource set, the transmission of the signal to be sent via the first resource set is abandoned.

In an optional embodiment, the sending module is configured to select the resource from the determined resource set by use of a method described below to send the signal to be sent:

It is determined, according to a sending probability, whether to select the resource for sending the signal to be sent from the determined resource set in a current resource period; or a resource period for sending the signal to be sent is determined according to a size of a back-off window; and the resource for sending the signal to be sent is selected from the determined resource set according to the determined resource period.

In an optional embodiment, the sending module is configured to select the resource from the determined resource set by use of a method described below to send the signal to be sent:

If the determined resource set is the first resource set, it is determined, according to a sending probability, whether to select a resource for sending the signal to be sent from the first resource set in a current resource period; or a resource period for sending the signal to be sent is determined according to a size of a back-off window, and the resource for sending the signal to be sent is selected from the first resource set according to the determined resource period; and/or if the determined resource set is the second resource set, then in each resource period within a validity period for sending the signal to be sent, a resource for sending the signal to be sent is selected from the second resource set.

In an optional embodiment, the device further includes a monitoring module, which is configured to monitor the signal in one or more resource periods of the determined resource set, and to determine, according to a monitored resource load, a probability of sending the signal in the one or more resource periods or determine the back-off window according to the monitored resource load, where the resource load is determined by one or more of the following measurements: the signal reception power and a signal successful reception rate over the radio resource.

In an optional embodiment, the monitoring module is further configured to monitor the signal in one or more resource periods of the determined resource set; and to determine, according to a monitored resource load, the sending power for sending the signal in the one or more resource periods, where the resource load is determined by one or more of the following measurements: the signal reception power and a signal successful reception rate over the radio resource.

In an optional embodiment, the sending module is configured to select the resource from the determined resource set by use of a method described below to send the signal to be sent:

The resource is randomly selected from the determined resource set, or the resource is selected from the determined resource set according to a selection probability of each resource, where the selection probability of the each resource is predetermined, or is determined as follows: the signal energy of the each resource of the determined resource set is monitored in the one or more resource periods of the determined resource set, and the probability of being selected for sending the signal is determined for each resource according to the signal energy.

In an optional embodiment, the second resource set determined by the first determining module includes multiple resource sub-sets, and different resource sub-sets are used by different groups of sending terminals to send the signal; and The second determining module is configured to, when determining that the signal to be sent is sent via the second resource set, determine, according to group information, the resource sub-set used for sending the signal to be sent.

Embodiments of the present disclosure further provide a computer-readable storage medium configured to store computer-executable instructions for implementing the above-mentioned wireless communication method when the computer-executable instructions are executed.

It will be understood by those of ordinary skill in the art that all or part of the steps in the method described above may be implemented by related hardware (e.g., a processor) instructed by one or more programs, and these programs may be stored in a computer-readable storage medium such as a ROM, a magnetic disk, an optical disk or the like. Optionally, all or part of the steps in the embodiments described above may also be implemented using one or more integrated circuits. Accordingly, the modules/units in the embodiments described above may be implemented by hardware. For example, the functions of these modules/units may be implemented by one or more integrated circuits. Alternatively, these modules/units may be implemented by software function modules. For example, the functions of these modules/units may be implemented by using a processor to execute program instructions stored in a storage medium. Embodiments of the present disclosure are not limited to any specific combination of hardware and software.

The above are only optional embodiments of the present application. The present application may have other various embodiments. Corresponding modifications and variations may be made by those skilled in the art according to the present application without departing from the spirit and essence of the present application. However, these corresponding modifications and variations fall within the scope of the claims in the present application.

INDUSTRIAL APPLICABILITY

Embodiments of the present disclosure provide a wireless communication method and device. Multiple resource sets with different attributes are configured and handover between the resource sets is performed according to the content and/or the type of the message carried in the signal. This ensures the delay requirement and the high reliability of specific signal transmission. Moreover, the self-adaptive probabilistic sending method based on listening (monitoring) or the method for determining the back-off window further reduces the probability of signal collision and improves the reliability of signal transmission.

What is claimed is:
1. A device-to-device wireless communication method comprising:
   determining a radio resource for device-to-device wireless communication, wherein the radio resource comprises a first resource set and a second resource set including different attributes;
   determining, according to a type of a message carried in a signal to be sent, a resource set used for sending the signal to be sent; and
   selecting a resource from the determined resource set to send the signal to be sent,
   wherein the step of determining, according to the type of the message carried in the signal to be sent, the resource set used for sending the signal to be sent comprises one of the following:
      in response to determining that the message is a periodic message, determining that the first resource set is used for sending the signal to be sent; and in response to determining that the message is a burst message, determining that the second resource set is used for sending the signal to be sent;
      in response to determining that the type of the message including a number of transmissions of the message in a resource period:
         in response to determining that the number of transmissions of the message is less than or equal to a first threshold, determining that the first resource set is used for sending the signal to be sent; and
         in response to determining that the number of transmissions of the message is greater than the first threshold, determining that the second resource set is used for sending the signal to be sent;
      in response to determining that the type of the message including a size of a load of the message,
         in response to determining that the size of the load of the message does not exceed a second threshold, determining that the first resource set is used for sending the signal to be sent; and
         in response to determining that the size of the load of the message exceeds the second threshold, determining that the second resource set is used for sending the signal to be sent;
      in response to determining that the type of the message being a format of the message and the format of the message being determined by the size of the load of the message and/or determined by whether the load of the message is variable, determining, according to the format of the message, the resource set used for sending the signal to be sent,
   wherein determining, according to the type of the message carried in the signal to be sent, the resource set used for sending the signal to be sent further comprises:
   in response to determining that a duration for sending the signal through the resource selected from the determined second resource set reaches a preset maximum duration or the signal has been consecutively sent through the resource selected from the determined second resource set for a preset maximum times, switching to the first resource set to send the signal to be sent or stopping sending the signal to be sent through the second resource set.

2. The method of claim 1, wherein:
selecting the resource from the determined resource set to send the signal to be sent comprises:
determining, according to a sending probability, whether to select the resource from the determined resource set in a current resource period to send the signal to be sent.

3. The method of claim 2, further comprising:
monitoring the signal in one or more resource periods of the determined resource set; and
determining, according to a monitored resource load, a probability of sending the signal in the one or more resource periods or determining the back-off window according to the monitored resource load, wherein the monitored resource load is determined by one or more of the following measurements: a signal reception power or a signal successful reception rate over the radio resource.

4. The method of claim 1, further comprising:
monitoring the signal in one or more resource periods of the determined resource set; and
determining, according to a monitored resource load, a sending power for sending the signal in the one or more resource periods, wherein the monitored resource load is determined by one or more of the following measurements: a signal reception power or a signal successful signal rate over the radio resource,
wherein selecting the resource from the determined resource set to send the signal to be sent comprises:
selecting the resource from the determined resource set to send, using the sending power, the signal to be sent.

5. The method of claim 1, wherein selecting the resource from the determined resource set comprises:
randomly selecting the resource from the determined resource set, or
selecting the resource from the determined resource set according to a selection probability of each resource, wherein the selection probability of the each resource is predetermined, or is determined by: monitoring signal energy in the each resource of the determined resource set in one or more resource periods of the determined resource set, and determining a probability of being selected for sending the signal for each resource according to the signal energy.

6. The method of claim 1, wherein the second resource set comprises a plurality of resource sub-sets, and different resource sub-sets of the plurality of resource sub-sets are used by different groups of sending terminals to send the signal; and in response to determining that the signal to be sent is sent through the second resource set, a resource sub-set used for sending the signal to be sent is determined according to group information.

7. The method of claim 1, wherein the selecting the resource from the determined resource set to send the signal to be sent comprises: determining, according to a size of a back-off window, a resource period for sending the signal to be sent; and selecting the resource from the determined resource set according to the determined resource period to send the signal to be sent.

8. The method of claim 1, wherein the selecting the resource from the determined resource set to send the signal to be sent comprises:
in response to determining that the determined resource set includes the first resource set, determining, according to a sending probability, whether to select a resource from the first resource set in a current resource period to send the signal to be sent; or determining, according to a size of a back-off window, a resource period for sending the signal to be sent, and selecting the resource from the first resource set according to the determined resource period to send the signal to be sent; and
in response to determining that the determined resource set includes the second resource set, then in each resource period within a validity period for sending the signal to be sent, selecting a resource from the second resource set to send the signal to be sent.

9. The method of claim 1, wherein the method is performed by a user equipment and the signal is to be sent to another user equipment.

10. A device-to-device wireless communication device, comprising: a processor and a memory communicably connected to the processor, the memory storing instructions executable by the processor,
wherein execution of the instructions by the processor causes the processor to perform a method, and the method comprises:
determining a radio resource for device-to-device wireless communication, wherein the radio resource comprises a first resource set and a second resource set different in attributes;
determining, according to a type of a message carried in a signal to be sent, a resource set used for sending the signal to be sent; and
selecting a resource from the determined resource set to send the signal to be sent,
wherein the step of determining, according to the type of the message carried in the signal to be sent, the resource set used for sending the signal to be sent comprises one of the followings:
in response to determining that the message is a periodic message, determining that the first resource set is used for sending the signal to be sent; and in response to determining that the message is a burst message, determining that the second resource set is used for sending the signal to be sent;
in response to determining that the type of the message including a number of transmissions of the message in a resource period, in response to determining that the number of transmissions of the message is less than or equal to a first threshold, determining that the first resource set is used for sending the signal to be sent; and in response to determining that the number of transmissions of the message is greater than the first threshold, determining that the second resource set is used for sending the signal to be sent;
in response to determining that the type of the message including a size of a load of the message, in response to determining that the size of the load of the message does not exceed a second threshold, determining that the first resource set is used for sending the signal to be sent; and in response to determining that the size of the load of the message exceeds the second threshold, determining that the second resource set is used for sending the signal to be sent;
in response to determining that the type of the message being a format of the message and the format of the message being determined by the size of the load of the message and/or determined by whether the load of the message is variable, determining, according to the format of the message, the resource set used for sending the signal to be sent,
wherein the determining, according to the type of the message carried in the signal to be sent, the resource set used for sending the signal to be sent further comprises:
in response to determining that a duration for sending the signal through the resource selected from the determined second resource set reaches a preset maximum duration or the signal has been consecutively sent through the resource selected from the determined second resource set for a preset maximum times, switching to the first resource set to send the signal to be sent or stopping sending the signal to be sent through the second resource set.

11. The device-to-device wireless communication device of claim 10, wherein the selecting the resource from the determined resource set to send the signal to be sent comprises: determining, according to a sending probability, whether to select the resource from the determined resource set in a current resource period to send the signal to be sent.

12. The device-to-device wireless communication device of claim 10, wherein the selecting the resource from the determined resource set to send the signal to be sent comprises: determining, according to a size of a back-off window, a resource period for sending the signal to be sent; and selecting the resource from the determined resource set according to the determined resource period to send the signal to be sent.

13. The device-to-device wireless communication device of claim 10, wherein the selecting the resource from the determined resource set to send the signal to be sent comprises:
  in response to determining that the determined resource set includes the first resource set, determining, according to a sending probability, whether to select a resource from the first resource set in a current resource period to send the signal to be sent; or determining, according to a size of a back-off window, a resource period for sending the signal to be sent, and selecting the resource from the first resource set according to the determined resource period to send the signal to be sent; and/or
  in response to determining that the determined resource set includes the second resource set, then in each resource period within a validity period for sending the signal to be sent, selecting a resource from the second resource set to send the signal to be sent.

14. The device-to-device wireless communication device of claim 11, wherein the method further comprises:
  monitoring the signal in one or more resource periods of the determined resource set; and
  determining, according to a monitored resource load, a probability of sending the signal in the one or more resource periods or determining the back-off window according to the monitored resource load, wherein the monitored resource load is determined by one or more of the following measurements: a signal reception power or a signal successful reception rate over the radio resource.

15. The device-to-device wireless communication device of claim 10, wherein the method further comprises:
  monitoring the signal in one or more resource periods of the determined resource set; and
  determining, according to a monitored resource load, a sending power for sending the signal in the one or more resource periods, wherein the monitored resource load is determined by one or more of the following measurements: a signal reception power or a signal successful signal rate over the radio resource,
  wherein selecting the resource from the determined resource set to send the signal to be sent comprises:
  selecting the resource from the determined resource set to send, using the sending power, the signal to be sent.

16. The device-to-device wireless communication device of claim 10, wherein the selecting the resource from the determined resource set comprises:
  randomly selecting the resource from the determined resource set, or
  selecting the resource from the determined resource set according to a selection probability of each resource, wherein the selection probability of the each resource is predetermined, or is determined by: monitoring signal energy in the each resource of the determined resource set in one or more resource periods of the determined resource set, and determining a probability of being selected for sending the signal for each resource according to the signal energy.

17. The device-to-device wireless communication device of claim 10, wherein the second resource set comprises a plurality of resource sub-sets, and different resource sub-sets of the plurality of resource sub-sets are used by different groups of sending terminals to send the signal; and in response to determining that the signal to be sent is sent through the second resource set, a resource sub-set used for sending the signal to be sent is determined according to group information.

18. A device-to-device wireless communication method comprising:
  determining a radio resource for wireless communication, wherein the radio resource comprises a first resource set and a second resource set including different attributes;
  determining, according to content of a message carried in a signal to be sent, a resource set used for sending the signal to be sent; and
  selecting a resource from the determined resource set to send the signal to be sent,
  wherein the determining, according to the content of the message carried in the signal to be sent, the resource set used for sending the signal to be sent comprises:
    when the content of the message meets a preset condition, determining that the first resource set is used for sending the signal to be sent; and when the content of the message does not meet the preset condition, determining that the first resource set and the second resource set are used for sending the signal to be sent, or determining that the second resource set is used for sending the signal to be sent, and
    after selecting the resource from the determined second resource set to send the signal, if the content of the message carried in the signal to be sent meets the preset condition, switching to the first resource set to send the signal to be sent or stopping sending the signal to be sent through the second resource set.

19. The method of claim 18, wherein the determining, according to content of the message carried in the signal to be sent, the resource set used for sending the signal to be sent further comprising:
  if a duration for sending the signal through the resource selected from the determined second resource set reaches a preset maximum duration or the signal has been consecutively sent through the resource selected from the determined second resource set for a preset maximum times, switching to the first resource set to send the signal to be sent or stopping sending the signal to be sent through the second resource set.

20. The method of claim 18, wherein the selecting the resource from the determined resource set to send the signal to be sent comprises:
  determining, according to a sending probability, whether to select the resource from the determined resource set in a current resource period to send the signal to be sent; or
  determining, according to a size of a back-off window, a resource period for sending the signal to be sent; and selecting the resource from the determined resource set according to the determined resource period to send the signal to be sent;
  or
  the selecting the resource from the determined resource set to send the signal to be sent comprises:
  if the determined resource set is the first resource set, determining, according to a sending probability, whether to select a resource from the first resource set in a current resource period to send the signal to be sent; or determining, according to a size of a back-off window, a resource period for sending the signal to be sent, and selecting the resource from the first resource set according to the determined resource period to send the signal to be sent; and/or if the determined resource set is the second resource set, then in each resource period within a validity period for sending the signal to be sent, selecting a resource from the second resource set to send the signal to be sent.

* * * * *